(12) United States Patent
Yasuda et al.

(10) Patent No.: US 7,392,725 B2
(45) Date of Patent: Jul. 1, 2008

(54) STEERING WHEEL

(75) Inventors: Tetsuo Yasuda, Aichi-ken (JP); Akio Hosoi, Aichi-ken (JP); Norio Umemura, Aichi-ken (JP); Akiyoshi Ishikawa, Nagoya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 146 days.

(21) Appl. No.: 11/376,546

(22) Filed: Mar. 16, 2006

(65) Prior Publication Data

US 2006/0236807 A1 Oct. 26, 2006

(30) Foreign Application Priority Data

Mar. 17, 2005 (JP) ............................. 2005-077500

(51) Int. Cl.
*B62D 1/04* (2006.01)
(52) U.S. Cl. ...................................................... 74/552
(58) Field of Classification Search ................... 74/552, 74/553, 557
See application file for complete search history.

(56) References Cited

U.S. PATENT DOCUMENTS

| | | | |
|---|---|---|---|
| 6,418,814 B1 * | 7/2002 | Emeneth et al. ............... | 74/552 |
| 6,499,377 B1 * | 12/2002 | Schuler ........................ | 74/558 |
| 6,637,289 B2 * | 10/2003 | Kreuzer et al. ................ | 74/552 |
| 6,761,086 B2 * | 7/2004 | Kreuzer et al. ................ | 74/552 |
| 6,877,397 B2 * | 4/2005 | Albayrak et al. .............. | 74/552 |

FOREIGN PATENT DOCUMENTS

| | | |
|---|---|---|
| DE | 44 18 960 A1 | 12/1995 |
| JP | A-2000-142424 | 5/2000 |
| JP | A-2000-264222 | 9/2000 |

* cited by examiner

*Primary Examiner*—Vicky A Johnson
(74) *Attorney, Agent, or Firm*—Posz Law Group, PLC

(57) ABSTRACT

A steering wheel has a rim part, and the rim part includes a rim core portion which is made through die casting and a rim cover portion which covers an outer surface of the rim core portion. The rim cover portion is provided with a rim cover body and a garnish made of a synthetic resin. A reinforcement member is provided on the garnish.

10 Claims, 7 Drawing Sheets

STEERING WHEEL

BACKGROUND OF THE INVENTION

1. Field of the Invention

The present invention relates to a steering wheel that is to be mounted on a vehicle.

2. Related Art

Conventionally, there has been known, as this type of steering wheel, a steering wheel in which a decorative component is mounted on part of an annular rim part so that the design property of the steering wheel is enhanced by the decorative component so mounted (for example, refer to JP-A-2000-264222). A steering wheel disclosed in JP-A-2000-264222 includes a cover portion of a synthetic resin which covers a core, a mount element of a synthetic resin which is mounted on the cover portion, and a decorative component which is brought into engagement with the mount element. The mount element is fixed to the cover portion by insert molding the synthetic resin.

The design property is one of performances required for a steering wheel, and the deformation of a designed steering wheel is required to be suppressed even when affected by a surrounding environment. In particular, in a decorative component, in the event that a decorative element which controls a design aspect of the steering wheel and a main body which functions as a base portion are made of different materials, it is considered that the deformation becomes remarkable due to the effect of heat because the physical properties such as expansion coefficients thereof differ. For example, in the event that a natural wood is used for part or the whole of the decorative element, whereas a synthetic resin is used for the base portion, in an atmosphere where the temperature is higher than the room temperature (80 to 100° C.), the wood tends to contract largely, whereby when the decorative component is viewed in cross section, it is considered that the decorative component deforms in such a manner that end portions thereof float or separate from the rim part of the steering wheel.

SUMMARY OF THE INVENTION

The invention was made in view of the problem, and an object thereof is to provide a steering wheel which can easily be produced and in which a decorative component can exhibit a sufficient design property.

(1) With a view to attaining the object, according to a first aspect of the invention, there is provided a steering wheel comprising:

a rim part including a core and a cover portion surrounding said core to cover an outer surface of said core, said cover portion including a decorative component having a base portion made of a synthetic resin;

wherein said a decorative-side engagement portion of said decorative component is fixed to a core-side engagement portion of said core, whereby said decorative component is fixed to said core;

wherein said decorative component is provided with a reinforcement member that is made of a metal.

According to the configuration of the first aspect of the invention, since the decorative component includes the reinforcement member, the rigidity of the decorative component is increased, whereby the deformation of the decorative component due to the effect of heat is suppressed. Consequently, according to the steering wheel, a reduction in design property is suppressed.

(2) According to a second aspect of the invention, said decorative component may include a mount seat on which said reinforcement member is mounted.

According to the second aspect of the invention, since the reinforcement member is mounted on the mount seat of the decorative component, the mounting position of the reinforcement member relative to the decorative component is assuredly fixed, and additionally, an effect of rigidity enhancement by the reinforcement member can be expanded to the decorative component.

(3) According to a third aspect of the invention, said mount seat is held between a part of the rim part which is other than said decorative component and said reinforcement member.

According to the third aspect of the invention, since the mount seat of the decorative component is held so as to be pressed against the part of the rim part which is other than the decorative component by the reinforcement member, the effect of rigidity enhancement by the reinforcement member can be expanded further to the decorative component.

(4) According to a fourth aspect of the invention, a cross section of the decorative component at a location where the mount seat is provided may be formed into substantially an annular shape surrounding the reinforcement member therein.

According to the fourth aspect of the invention, since the cross section of the decorative component is formed into substantially the annular shape surrounding the reinforcement member therein, the effect of rigidity enhancement by the reinforcement member can be expanded to the decorative component.

(5) According to a fifth aspect of the invention, the mount seat may also serve the decorative-side engagement portion.

According to the fifth aspect of the invention, since the mount seat also serves as the decorative-side engagement portion, not only can the effect of rigidity enhancement by the reinforcement member be expanded to the decorative component, but also a separate decorative-side engagement portion does not have to be provided, thereby making it possible to simplify the configuration of the decorative component.

(6) According to a sixth aspect of the invention, a plurality of the reinforcement members may be provided along the decorative component.

According to the sixth aspect of the invention, since the plural reinforcement members are provided along the decorative component, a partial reinforcement is made possible, and the restriction due to the shape of the decorative component is mitigated, and the degree of freedom in arrangement and configuration of the reinforcement member is increased, thereby making it possible to obtain optimal arrangement and configuration for the reinforcement member.

(7) Further, according to the invention, a plurality of mount seats may be provided along said decorative component at a constant interval.

(8) According to the invention, said mount seat may be integrally formed with said base portion of said decorative component on an opposite surface to an outer surface of said decorative component.

(9) According to the invention, said reinforcement member may be formed into an L-shape in which two plate portions are combined at substantially right angle to each other.

(10) According to the invention, said decorative-side engagement portion may include an engagement portion of a clip and said core-side engagement portion includes an engagement hole formed on said core, wherein said decorative component is fixed to said core by inserting said engagement portion of said clip into said engagement hole.

(11) According to the invention, said reinforcement member may be interposed between a part of said clip and said core.

(12) According to the invention, a mount seat on which said reinforcement member is mounted may be integrally formed with said base portion of said decorative component on an opposite surface to an outer surface of said decorative component, and a part of said mount seat may be interposed between a part of said clip and said core.

According to the invention, there can be provided the steering wheel which can easily be produced and which can exhibit a sufficient design property by the decorative component.

DETAILED DESCRIPTION OF THE PREFERRED EMBODIMENTS

Figure 1:
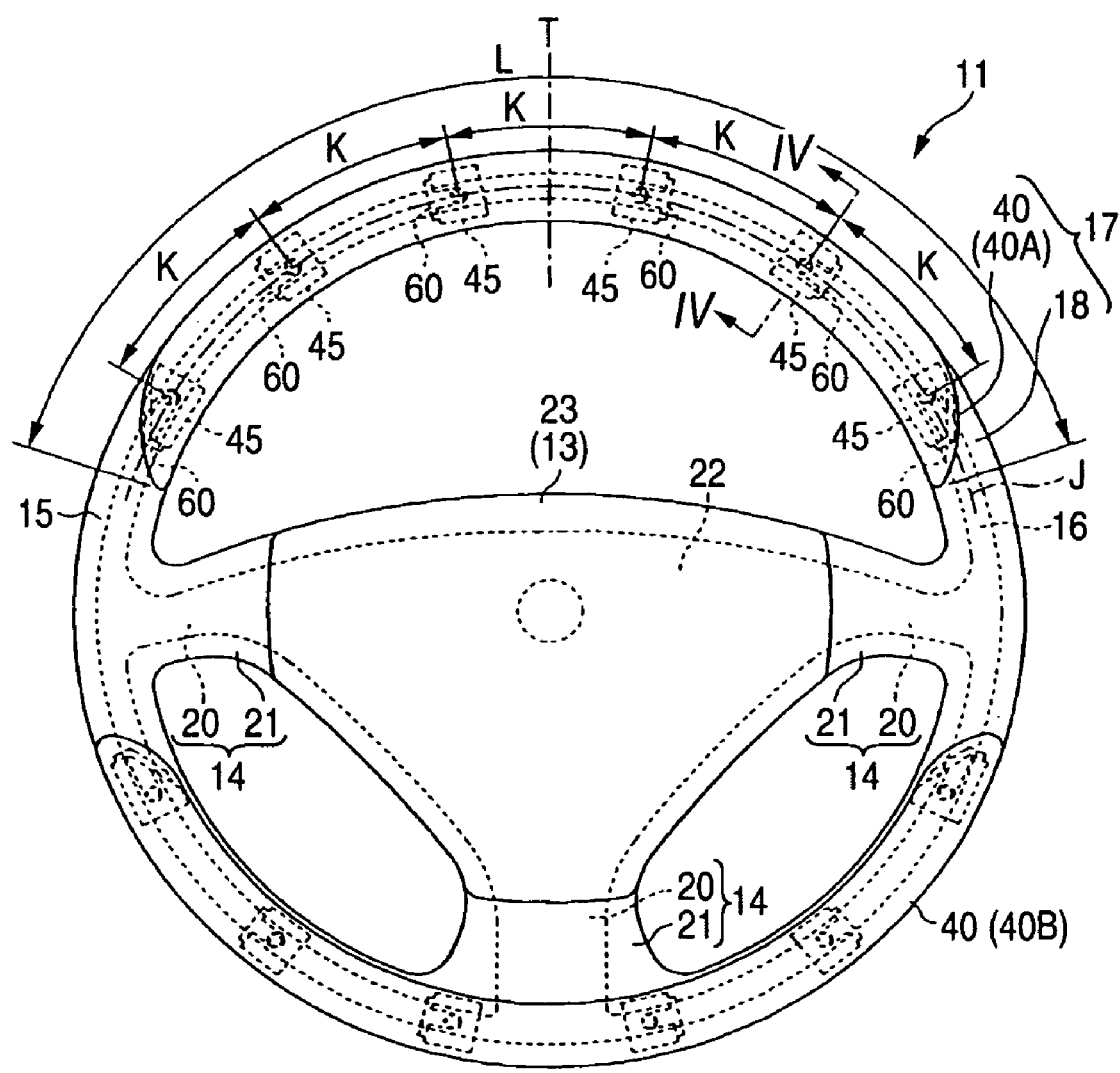
FIG. 1 is a plan view which shows a steering wheel of an embodiment of the invention.

Hereinafter, an embodiment in which the invention is embodied into an automotive steering wheel will be described in detail by reference to the accompanying drawings. As shown in FIG. 1, when viewed from a driver's side, a steering wheel 11 includes an annular rim part 15, a pad part 13 which is disposed inside of the rim part 15 at a central portion thereof, and a plurality (three in this embodiment) of spoke parts 14 which connect the rim part 15 and the pad part 13 together. The rim part 15 is provided with an annular rim core portion 16, which functions as a core, and a rim cover portion 17 which functions as a cover portion which covers an outer surface of the rim core portion 16. The rim cover portion 17 includes an annular rim cover body 18, a skin 19 which is provided on an outer surface of the rim cover body 18, and garnishes 40 formed in a curved plate, which function as decorative components.

Note that in the steering wheel 11 shown in FIG. 1, upward/downward, leftward/rightward, and forward/rearward directions are directions which result when a straight traveling direction of a vehicle is regarded as forward and substantially coincide with upward/downward, leftward/rightward, and forward/rearward directions of the vehicle.

The rim core portion 16 is made of a metal material such as aluminum, aluminum alloy, magnesium, and magnesium alloy through die casting. A spoke core portion 20 formed in a quadrangular plate is provided individually on left, right and bottom sides of the rim core portion 16 so as to extend inwardly of the rim core portion 16 (toward a boss plate 22, which will be described later on). A triangular plate-shaped boss plate 22 is connected to distal end portions of the respective spoke core portions, whereby a framework of the steering wheel 11 is configured in which the boss plate 22 is provided inside of the rim core portion 16 at the central portion thereof.

The pad part 13 is made by covering an outer surface of the boss plate 22 with a boss cover portion 23. Note that the boss plate 22 is provided so as to protrude further forward than the rim part 15 and that an airbag system or the like (not shown) is mounted between the boss plate 22 and the boss cover portion 23. The spoke part 14 is made by covering an outer surface of the spoke core portion 20 with a spoke cover portion 21. This spoke cover portion 21 is formed integrally with the rim cover body 18. These rim cover body 18, the spoke cover portion 21 and the boss cover portion 23 are formed from a resin material such as polyurethane foam. In addition, a state resulting when the garnish 40 is removed from the steering wheel 11 is regarded as a steering wheel body 12.

Figure 2:
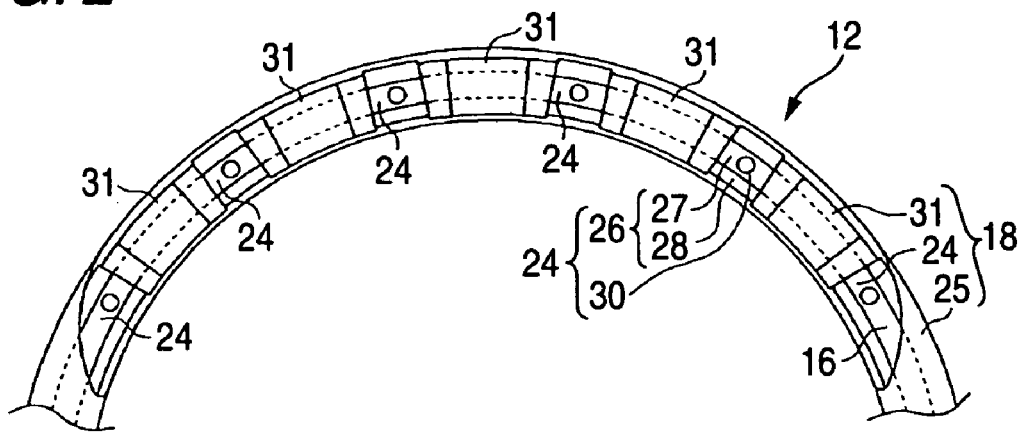
FIG. 2 is a plan view which shows a steering wheel body and a mount portion.
Figure 3:
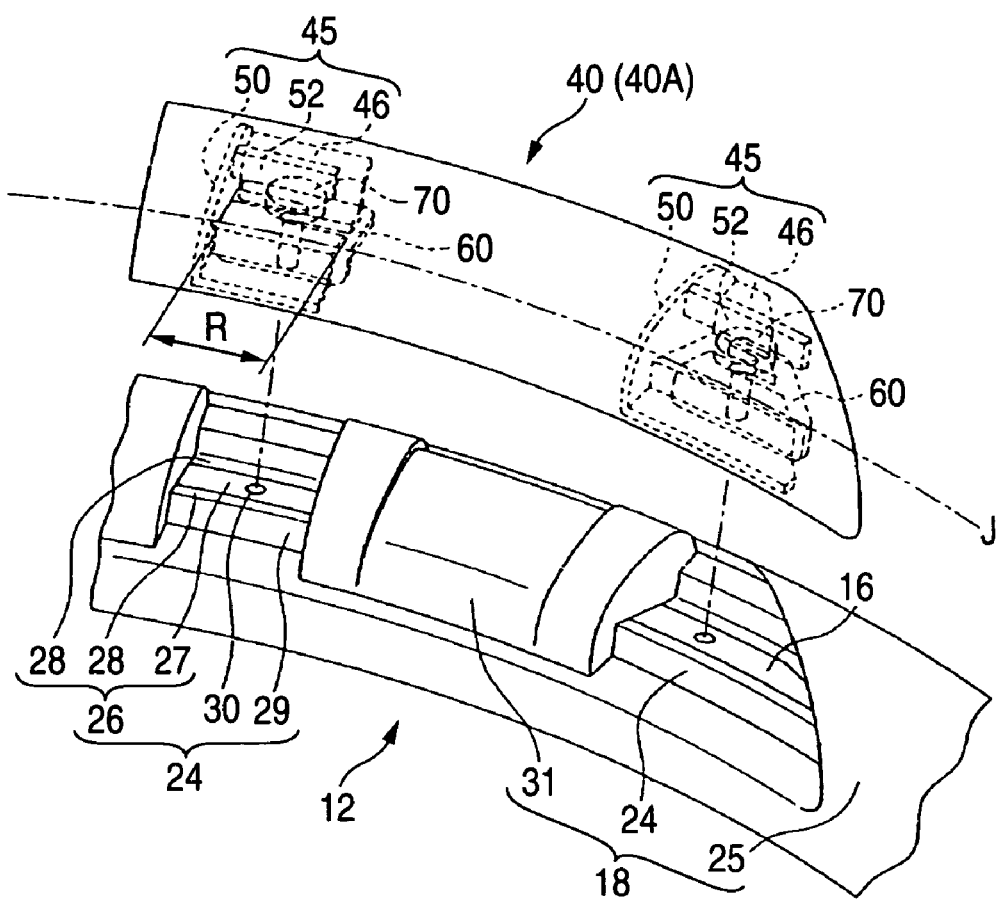
FIG. 3 is an exploded view which shows main parts of the steering wheel body and a garnish.

As shown in FIGS. 2 and 3, mount portions 24 are provided on the steering wheel body 12 at which the garnish 40 is fixed when it is mounted on the steering main body 12. The mount portion 24 is formed into a concave shape relative to a general portion 25 of the rim cover body 18 so that the garnish 40 can be mounted on the steering wheel body 12 so as to form an integral design (a continuous surface) with the steering wheel body 12. Mount seats 45, which will be described later on, are provided on the garnish 40, and a mount surface 26 adapted to be brought into abutment with part of the mount seat 45 is provided on the mount portion 24 at a position which correspond to the mount seat 45. In this embodiment, the mount surface 26 constitutes a surface which is provided with an upper surface 27 (an upper surface in FIG. 4) of the rim core portion 16 whose cross section (hereinafter, unless otherwise described, the cross section is described as denoting the shape of a plane which intersects a circumferential direction of the annular rim part 15 at right angles) is substantially quadrangular and a surface 28 which is formed by the rim cover body 18 along the upper surface 27. In addition, engagement holes 30 are formed in the rim core portion 16 as core-side engagement portions into which clips 70 functioning as engagement members (described later on), are brought into engagement and are exposed from the upper surface 27. Note that in FIGS. 2 and 3, while only the mount portions 24 on an upper side of the steering wheel body 12 are shown, mount portions which are provided on a lower side thereof are configured similarly. In addition, in FIGS. 2 and 3, the illustration of the skin 19 is omitted for the purpose of facilitating the understanding of the shape of the mount portions 24. Additionally, in this embodiment, while convex portions 31 are provided so as to fill spaces between the respective mount portions 24 for the purpose of suppressing a moment of inertia resulting when the steering wheel 11 is operated and resonant vibrations, the convex portions 31 may be omitted partially or totally unless the moment of inertia and resonant vibrations are taken into consideration.

The garnish 40 is provided in a pair on upper and lower sides of the steering wheel body 12. These garnishes 40 each include a garnish base body 41 that is formed in a curved plate and made of a synthetic resin such as a polycarbonate resin, ABS containing resin and the like, functioning as a base portion, and a decorative element (not shown) which is provided on a forward surface of the garnish base body 41. The decorative element is made of a different member from the garnish base body 41 (for example, a flexible thin plate-shaped member provided with a film on which a grain pattern is printed, a very thin slice of natural wood or a laminated element which includes the slice of natural wood, or a member in which the flexible thin plate-shaped member is attached to a shaped member which is shaped to a designed shape of the garnish 40 so as to be attached thereto) or a coating resulting from direct painting on the garnish base body 41.

Figure 4:
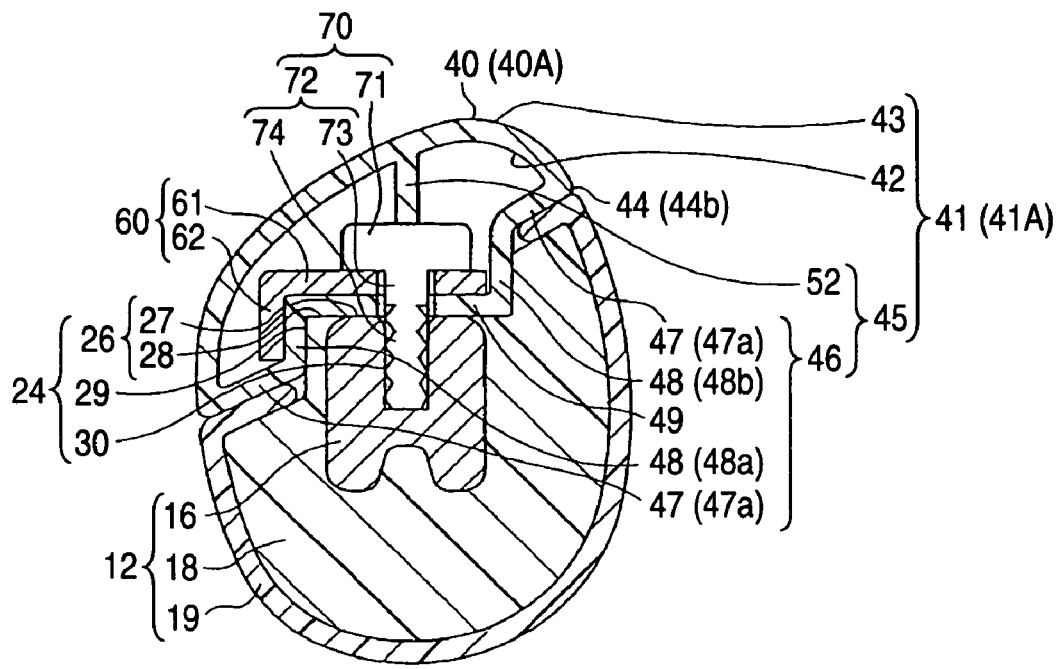
FIG. 4 is a sectional view taken along the line IV-IV in FIG. 1.
Figure 5:
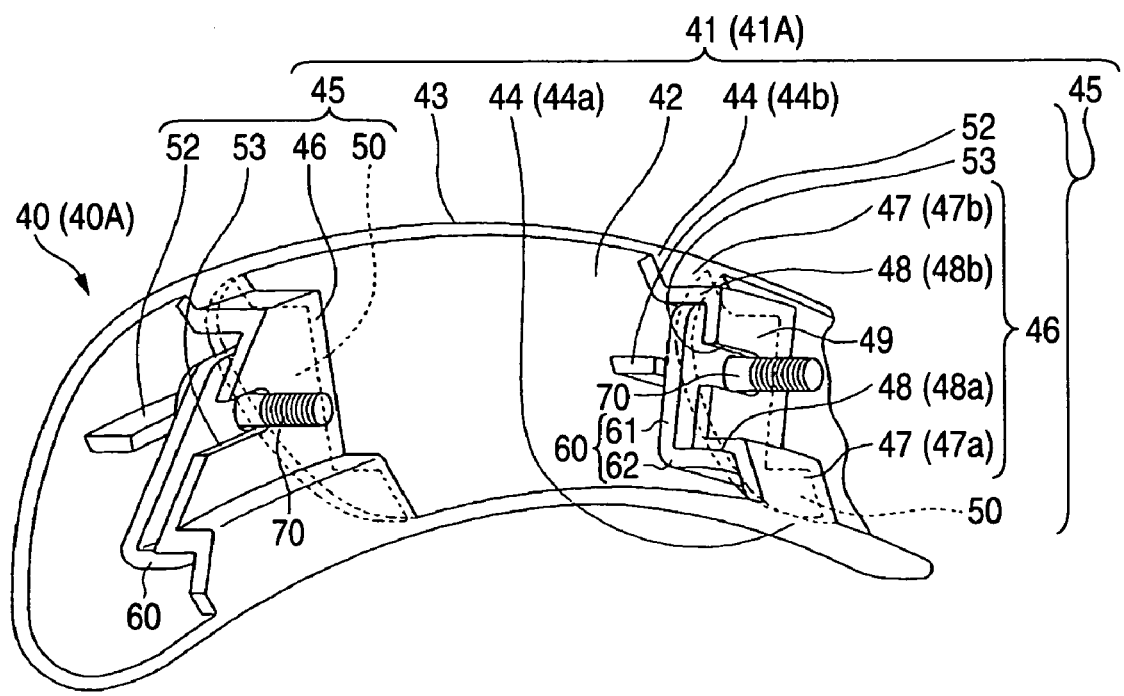
FIG. 5 is a perspective view which shows a main part of a rearward side of the garnish.
Figure 6:
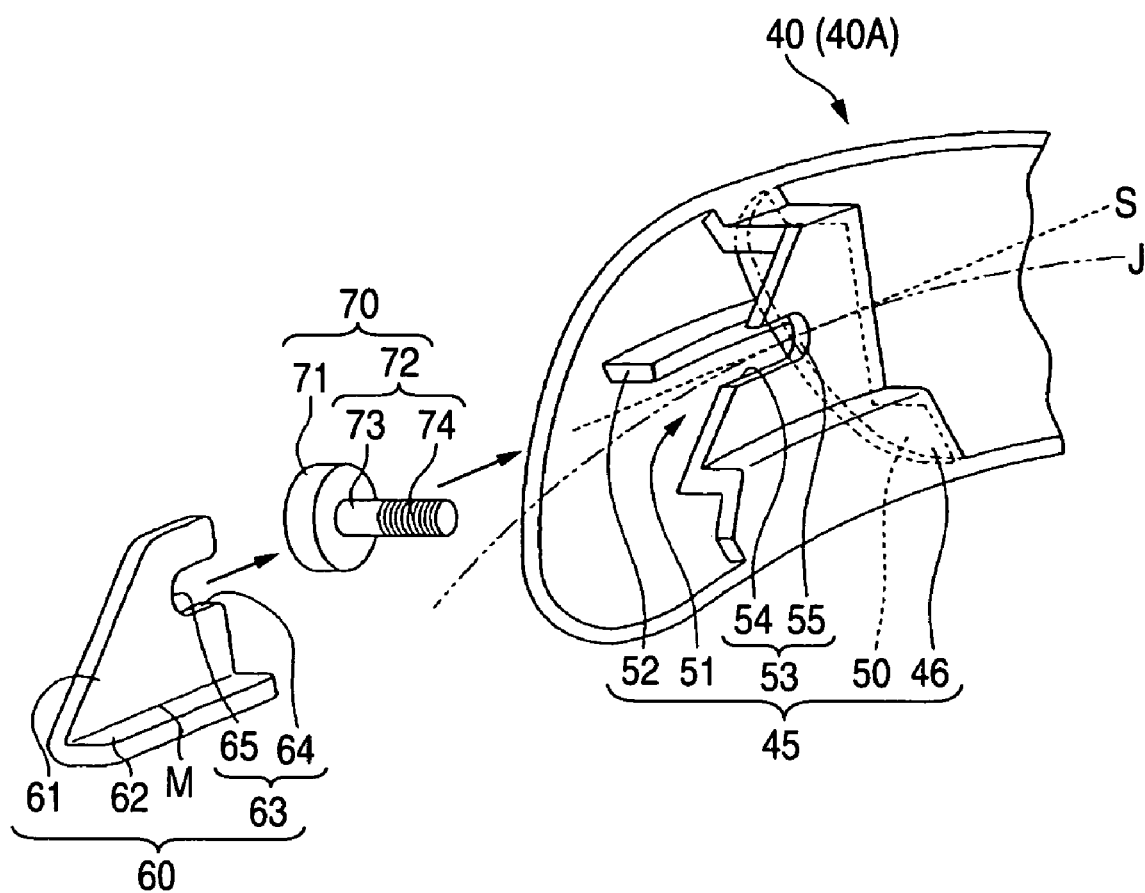
FIG. 6 is an exploded perspective view which shows the main part of the rearward side of the garnish.

As shown in FIGS. 1, 3, 4, these garnishes 40 are formed into curved shapes which follow a circumferential wall of the steering wheel body 12 as viewed in cross section. In addition, a forward surface (a decorative surface as viewed from the driver's side) of the garnish 40 is made to constitute part of an upper surface of the rim cover portion 17 and is formed into an arc shape which follows a circumferential annular shape of the rim part 15 when viewed from the driver's side. The forward surface of the garnish 40 is made to be different in appearance such as color, gloss or the like from a forward surface of the steering wheel body 12, and the design property of the steering wheel 11 is designed to be enhanced by these garnishes 40.

The mount seats 45, on which a reinforcement member 60, which will be described later on, is to be fixed in place, are provided on a rearward surface 42 of the upper garnish 40A which is opposite to the forward (decorative) surface thereof. In this embodiment, the mount seats 45 are disposed separately at six locations in total: two locations in the vicinity of circumferential end portions of the arc shape of the garnish 40A and four locations which lie circumferentially along the arc shape of the garnish 40A between the two locations at substantially equal intervals. In this embodiment, since an arc length L which extends circumferentially along the arc shape of the garnish 40A is about 453 mm, a distance K between the intervals which spread in an arc shape along the circumferential direction of the arc shape of the garnish 40A is set at about 68 mm. Since the distance of the interval between the respective mount seats 45 and the number of mount seats to be arranged change as the length L of the garnish 40A changes, it is desirable to determine on the number of mount seats to be arranged in such a manner that the distance K of the interval falls within a range from 50 mm to 70 mm. In addition, in the event that the distance K of the interval is set to fall within the range, the mount seats 45 may not be disposed at the equal intervals but may be disposed at unequal intervals.

As shown in FIGS. 3 to 6, each mount seat 45 protrudes from the rearward surface 42 of the garnish 40A and is formed into substantially a box shape having an opening 51 made by opening one of sides which intersect a circumferential axis J of the arc shape of the garnish 40A at right angles. Namely, as shown in FIG. 4, a cross section of the garnish 40A at a location where the mount seat 45 is provided is formed into substantially something like an annular shape at a resin portion of a garnish base body 41A. In addition, the resin portion of the garnish base body 41A which forms something like an annular shape is provided with a main body portion 43 having a designed shape whose cross section is formed into a curved shape and a box portion 46 which connects end portions 44 (44a, 44b) of the main body portion 43 in its cross section. In addition, the box portion 46 is provided with leg portions 47 (47a, 47b) which protrude from the end portions 44 (44a, 44b), respectively, a seat surface portion 49 and connecting portions 48 (48a, 48b) which connect the leg portions 47 (47a, 47b) and the seat surface portion 49, respectively.

The openings 51 of the respective mount seats 45 are made to open toward the nearer circumferential end portions of the arc shape of the garnish 40A, respectively, from a line of symmetry T which intersects the axis J at right angles as a boundary. An opposite side of the mount seat 45 to the opening 51 is blocked up by a wall portion 50 provided as will be described later on. In addition, a notched portion 53, which will be described later on, is provided on the seat surface portion 49 of the mount seat 45, and furthermore, a rib 52 is provided in an interior of the mount seat 45. Note that the seat surface portion 49 of the mount seat 45 is to be brought into abutment with the mount surface 26 of the mount portion 24 of the steering wheel body 12.

The reinforcement member 60 and the clip 70 are mounted on the mount seat 45 in a combined fashion. The reinforcement member 60 is formed into a so-called L-shape in which two plate portions are combined together at substantially right angles to each other. In addition, in the reinforcement member 60, a notched portion 63 is provided in one (a plate portion 61, which will be described later on) of the plates which form the L-shape together into which the clip 70 is inserted. Note that in this embodiment, the L-shape is realized not by joining two plate-shaped members but by bending a single plate-shaped member, and a sheet material of a metal (iron) which is 1.6 mm thick is used. Note that other metal materials such as aluminum may be used for the material of the reinforcement member 60. The clip 70 is provided with a heat portion 71 and a shaft portion 72 and is molded integrally from a resin such as nylon. The shaft portion 72 is provided with a root portion 73 and an engagement portion 74 functioning as a decorative-side engagement portion, which will both be described later on. Namely, the mount seat 45 also serves as a decorative-side engagement portion via the engagement portion 74 of the clip 70.

After the clip 70 and the reinforcement member 60 are assembled together in such a manner that the root portion 73 of the clip 70 is brought into a bottom portion 65 of the notched portion 63 of the reinforcement member 60, the reinforcement member 60 is inserted together with the clip 70 toward the interior of the mount seat 45 from an opening 51 side of the seat mount 45 in such an orientation that an opening side 64 of the notched portion 63 of the reinforcement member 60 faces an opening side 54 of the notched portion 53 of the mount seat 45, so as to be assembled to the garnish base body 41A. Note that a direction in which the reinforcement member 60 is inserted into the mount seat 45 is a direction in which a bending line M along which the reinforcement member 60 is bent into the L-shape and a tangent S to the axis J at each seat mount 45 become parallel with each other.

By inserting the root portion 73 of the clip 70 into the notched portion 53 of the mount seat 45 until the root portion 73 is brought into abutment with a bottom portion 55 of the notched portion 53, the root portion 73 of the clip 70 comes to be held between the bottom portion 65 of the reinforcement member 60 and the bottom portion 55, oscillation (looseness) is suppressed which is generated in directions extending along a surface which intersects the shaft portion 72 of the clip 70 at right angles (lateral and depth-wise directions as viewed in FIG. 4) In addition, the rib 52 which protrudes from the rearward surface of the garnish 40A is brought into abutment with the head portion 71 of the clip 70 at a location where the mount seat 45 is provided, whereby oscillation (looseness) in axial directions of the shaft portion 72 (vertical directions as viewed in FIG. 4) is suppressed.

In this embodiment, an overlapping margin R of the reinforcement member 60 and the mount seat 45 is set at about 24 mm at a largest overlapping portion, about 8 mm at a smallest overlapping portion and about 16 mm as an average between the largest and smallest overlapping portions at the two locations which lie in the vicinity of the circumferential end portions of the arc shape of the garnish 40A and is set at a constant length of about 11 mm at the remaining four locations between the two locations, when the overlapping margin R is seen as the length of a straight line which becomes parallel with a tangent direction which extends along the circumferential direction of the arc shape of the garnish 40A. A total length of the overlapping margins at the six locations desirably falls within a range from one third to one sixth the length L of the garnish 40A, and the length of the overlapping margin R at one of the locations falls desirably within a range from one twenty-fifth to one fiftieth the length L of the garnish 40A.

The engagement portions 74 of the clips 70 of the garnish 40A are inserted into the engagement holes 30 in the steering wheel body 12 for engagement therewith, whereby the garnish 40A and the steering wheel body 12 are assembled together. In the embodiment, an irregular shape which is something like the shape of a male thread is formed on the engagement portion 74, whereas an irregular shape which is something like the shape of a female thread is formed on the engagement hole 30, so that the irregular shapes are made to mesh with each other for engagement (forced fitting). The shapes of the engagement portion 74 and the engagement hole 30 for engagement do not have to be limited thereto, any shapes may be adopted, provided that they can provide an engagement strength equal to that provided in the embodiment. The plate portion 61 of the reinforcement member 60 which has the notched portion 63 is brought into surface abutment with or is made to overlap the seat surface portion 49 of the mount seat 45 and is connected thereto via the clip 70 and the rim core portion 16. Namely, a cross section of the garnish 40A at the location where the mount seat 45 is provided is formed into substantially an annular shape surrounding the reinforcement member 60 therein. In addition, in the embodiment, the other plate portion 62 of the reinforcement member 60 is brought into surface abutment with or is made to overlap the connecting portion 48 (48a) which is provided so as to extend from the seat surface portion 49. Consequently, even at this location, the cross section of the garnish 40A at the location where the mount seat 45 is provided is formed into substantially an annular shape surrounding the reinforcement member 60 therein. In addition, in this embodiment, in the cross section of the garnish 40A at the location where the mount seat 45 is provided, the portion where the reinforcement member 60 and the box portion 46 of the mount seat 45 are in surface abutment with or overlap each other continues to bend at substantially right angles at a portion along the length thereof so as to form substantially an L-shape. Furthermore, the seat surface portion 49 of the box portion 46 is brought into surface abutment with or is made to overlap the mount surface 26 on the steering wheel body 12, and the connecting portion 48 (48a) of the box portion 46 is brought into surface abutment with or is made to overlap a surface 29 which makes up the mount portion 24 of the steering wheel body 12 and continues to the mount surface 26 (more particularly, the surface 28 which is formed on the rim cover body 18) so as to intersect the mount surface 26 at substantially right angles. Namely, the portion where the box portion 46 and the mount portion 24 are in surface abutment with or overlap each other continues to bend at substantially right angles at a portion along the length thereof so as to form substantially an L-shape. Note that the surface 29 is formed on the rim cover body 18. In the embodiment, the portions which are brought into surface abutment with or are made to overlap each other are all brought into substantially planar surface abutment with or made to overlap each other in a substantially planar fashion, and the box portion 46 (more particularly, the connecting portion 48 (48a) of the box portion 46 to the seat surface portion 49) of the mount seat 45 is held by the reinforcement member 60 and a location of the steering wheel body 12 (more particularly, the rim core portion 16 and the rim cover body 18) where the mount portion 24 is provided. Note that a lower garnish 40B has the same configuration as that of the upper garnish 40A.

The garnish 40 is configured into what has been described heretofore in the embodiment. Therefore, since the garnish 40, which functions as a decorative component, includes the reinforcement member 60 on the rearward surface thereof, the rigidity of the garnish 40 is increased, and for example, when natural wood is used for part or the whole of the decorative element (not shown) and synthetic resin is used for the garnish base body 41, which functions as the base portion, the decorative component is restrained from deforming in such a way that end portions thereof float or separate from the rim part of the steering wheel, when the decorative component is viewed in cross section. Consequently, with this steering wheel 11, a reduction in design property is suppressed. In addition, in the embodiment, since the cross section of the reinforcement member 60 which is provided with the plate-shaped member is formed into the L-shape to thereby increase its rigidity higher than that resulting when the reinforcement member 60 would be formed into a simple flat shape, when considering from the viewpoint of shape, the deformation of the garnish 40 is suppressed further.

In addition, since the garnish 40 includes the mount seat 45 on which the reinforcement member 60 is mounted, the mounting position of the reinforcement member 60 on the garnish 40 is reliably determined, and furthermore, the effect of enhancement in rigidity by the reinforcement member 60 can be expanded to the garnish 40.

Additionally, since the box portion 46 of the mount seat 45 (more particularly, the seat surface portion 49 and the connecting portion 48 (48a) of the box portion 46) is held by the reinforcement member 60 and the location of the steering wheel body 12 (more particularly, the rim core portion 16 and the rim cover body 18) where the mount portion 24 is provided, the box portion 46 is held so as to be pressed against the steering wheel body 12 by the reinforcement member 60, whereby the effect of enhancement in rigidity by the reinforcement member is expanded to the decorative component.

In addition, since the cross section of the garnish 40 at the location where the mount seat 45 is provided is formed into substantially the annular shape surrounding the reinforcement member 60 therein, the effect of enhancement in rigidity by the reinforcement member 60 is expanded much more to the garnish 40. Furthermore, since the mount seat 45 protrudes from the rearward side of the garnish 40A so as to be formed into substantially the box shape in which the opening 51 is provided to open one of the sides thereof which intersect the circumferential axis J of the arc shape of the garnish 40A, whereas the wall portion 50 is provided to block up the other side, the effect of enhancement in rigidity by the reinforcement member 60 is expanded to the garnish 40.

Additionally, since the mount seat 45 also serves as the decorative-side engagement portion via the clip 70, due to the garnish 40 being assembled to the steering wheel body 12, the effect of enhancement in rigidity by the reinforcement member 60 is expanded much more to the garnish 40, and moreover, since no separate decorative-side engagement portion has to be provided, the configuration of the garnish 40 can be simplified. In particular, in the embodiment, since the reinforcement member 60 and the steering wheel body 12 hold the box portion 46 of the mount seat 45 therebetween in such a state that the cross section of the garnish 40 at the location where the mount seat 45 is provided is formed into substantially the annular shape surrounding the reinforcement member 60 therein, the effect of enhancement in rigidity is expanded to the garnish 40 synergistically.

In addition, since the reinforcement member 60 is divided into the plurality of portions along the circumferential direction of the arc shape of the garnish 40, not only can the garnish 40 be reinforced partially but also the restriction by the shape of the garnish 40 is mitigated, so as to increase the degree of freedom in arrangement and configuration of the reinforcement member 60, thereby making it possible to obtain optimal arrangement and configuration for the reinforcement member 60. In the embodiment, the reinforcement member 60 is designed to be assembled to the garnish 40 only by being inserted rectilinearly into the mount seat 45 from the opening 51 side thereof, whereby the assembly of the reinforcement member 60 to the garnish 40 can be implemented in a simple fashion.

According to the invention, the steering wheel 11 can be provided which can provide the aforesaid superior effect, can be produced easily, and can exhibit a sufficient design property by the garnish 40 which functions as the decorative component.

Figure 7:
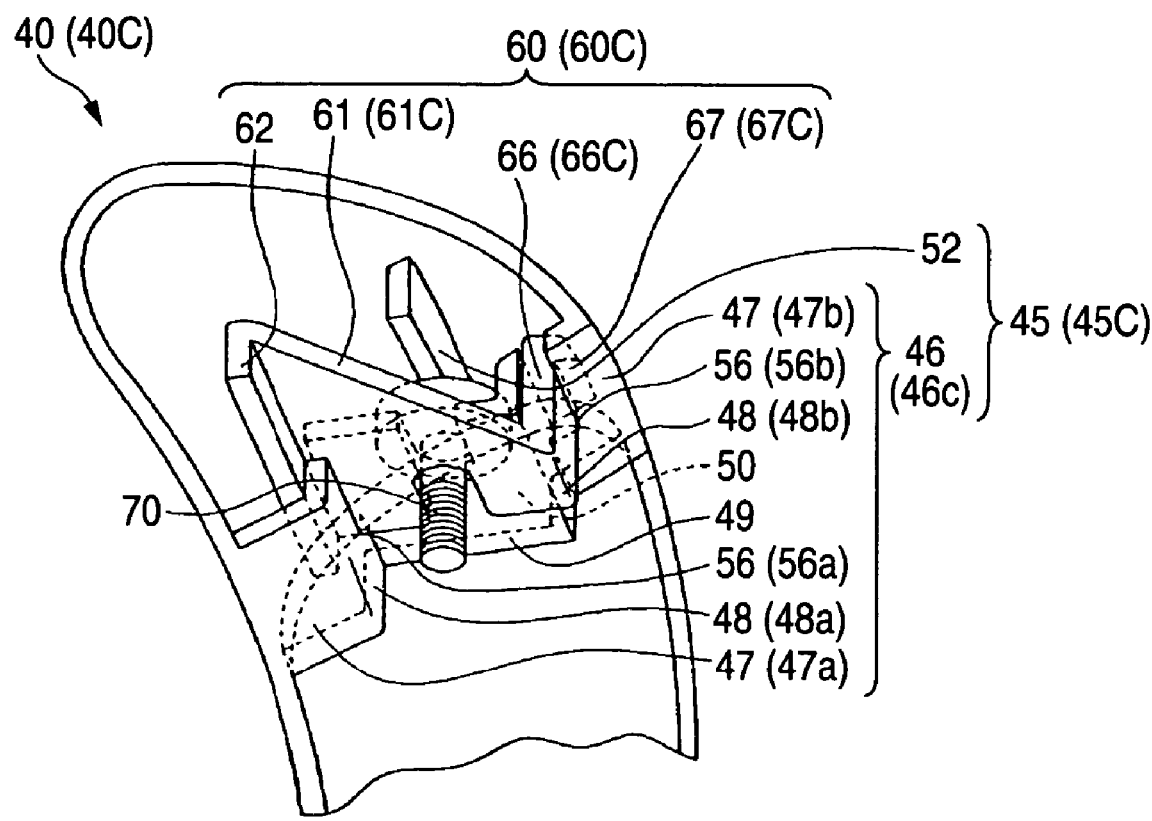
FIG. 7 is a perspective view which shows a main part on a rearward side of a garnish of a modified example made to the embodiment.
Figure 8:
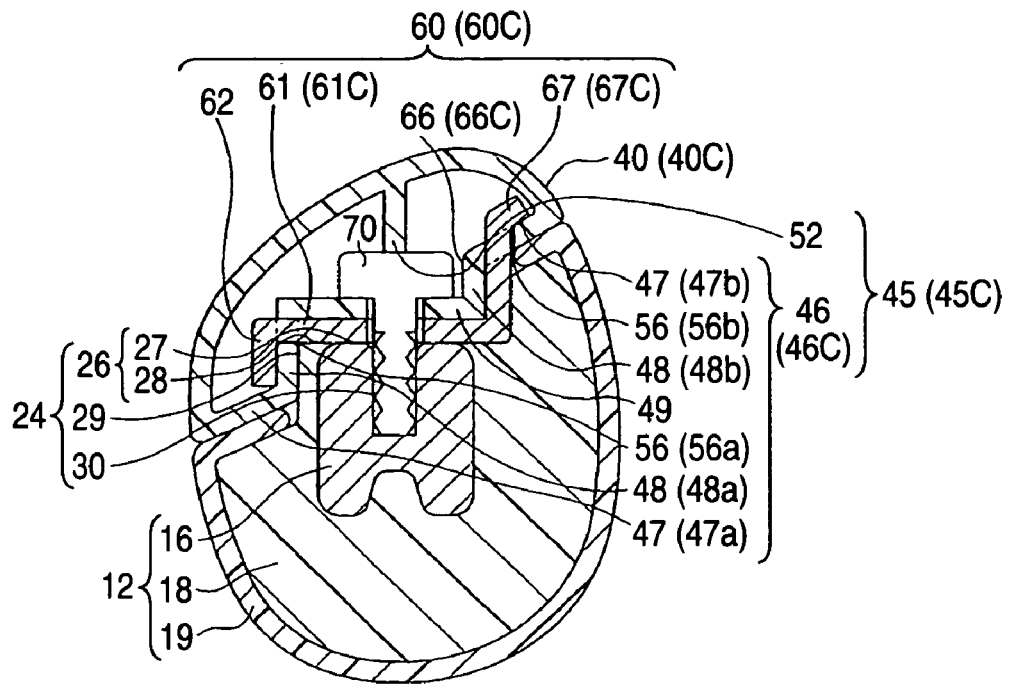
FIG. 8 is a sectional view of the modified example of the embodiment.

A modified example of the embodiment will be described by reference to FIGS. 7 and 8. A garnish 40C defers from the garnish 40A in that in a box portion 46C of a mount seat 45C, notched portions 56 (56a, 56b) are provided through which a reinforcement member 60C is inserted for assembly, in that in the reinforcement member 60C, the reinforcement member 60C has an extending portion 66 (66C) which is provided thereon so as to extend from a plate portion 61C which corresponds to the plate portion 61 of the reinforcement member 61, so that an end portion 67 (67C) of the extending portion 66 (66C) is brought into abutment with a leg portion 47 (47b) of the mount seat 45C, and in that the plate portion 61C covers an outside of a seat surface portion 49 to thereby be brought into abutment with or is made to overlap the seat surface portion 49. Due to this, the reinforcement member 60C is brought into direct abutment with the mount surface 26 of the mount portion 24 of the steering wheel body 12, and the box portion 46C (more particular, a connecting portion 48 (48a) and the leg portion 47 (47b) of the box portion 46C) of the mount seat 45C is held by the reinforcement member 60C (more particularly, a plate portion 62 and the end portion 67 (67C) of the reinforcement member 60C) and the location of the steering wheel body 12 (more particularly, the rim cover body 18 or the skin 19 which provided on the outer surface of the rim cover body 18) where the mount portion 24 is provided. In this embodiment, too, however, a cross section of the garnish 40C at a location where the mount seat 45C is provided is formed into substantially an annular shape surrounding the reinforcement member 60C therein. Consequently, a similar advantage to that provided by the garnish 40A can be obtained.

Figure 9:
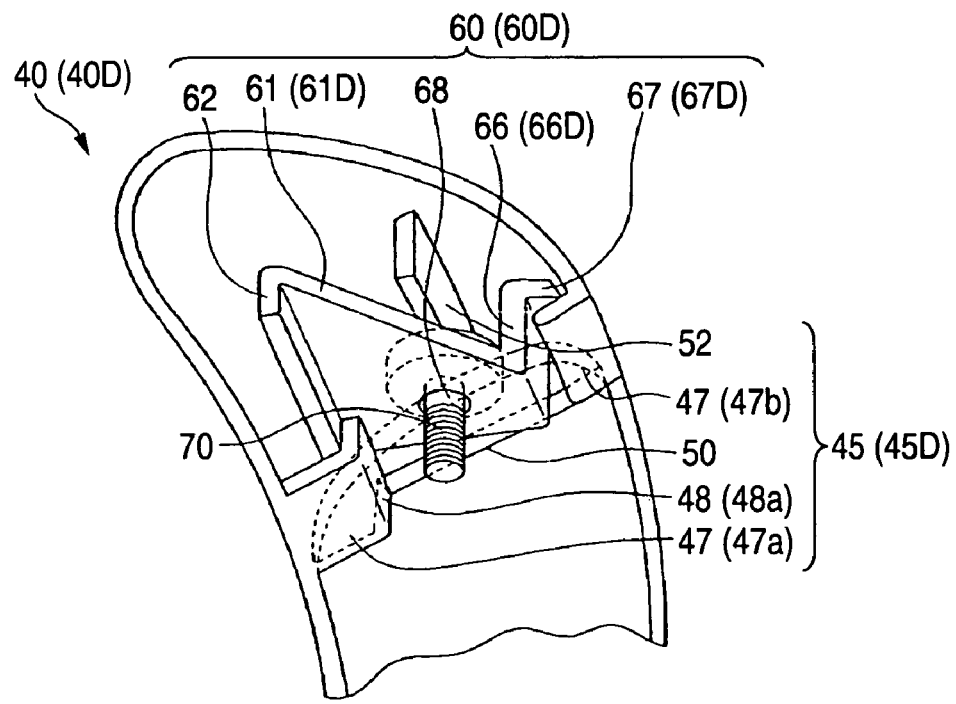
FIG. 9 is a perspective view which shows a main part on a rearward side of a garnish of another modified example made to the embodiment.
Figure 10:
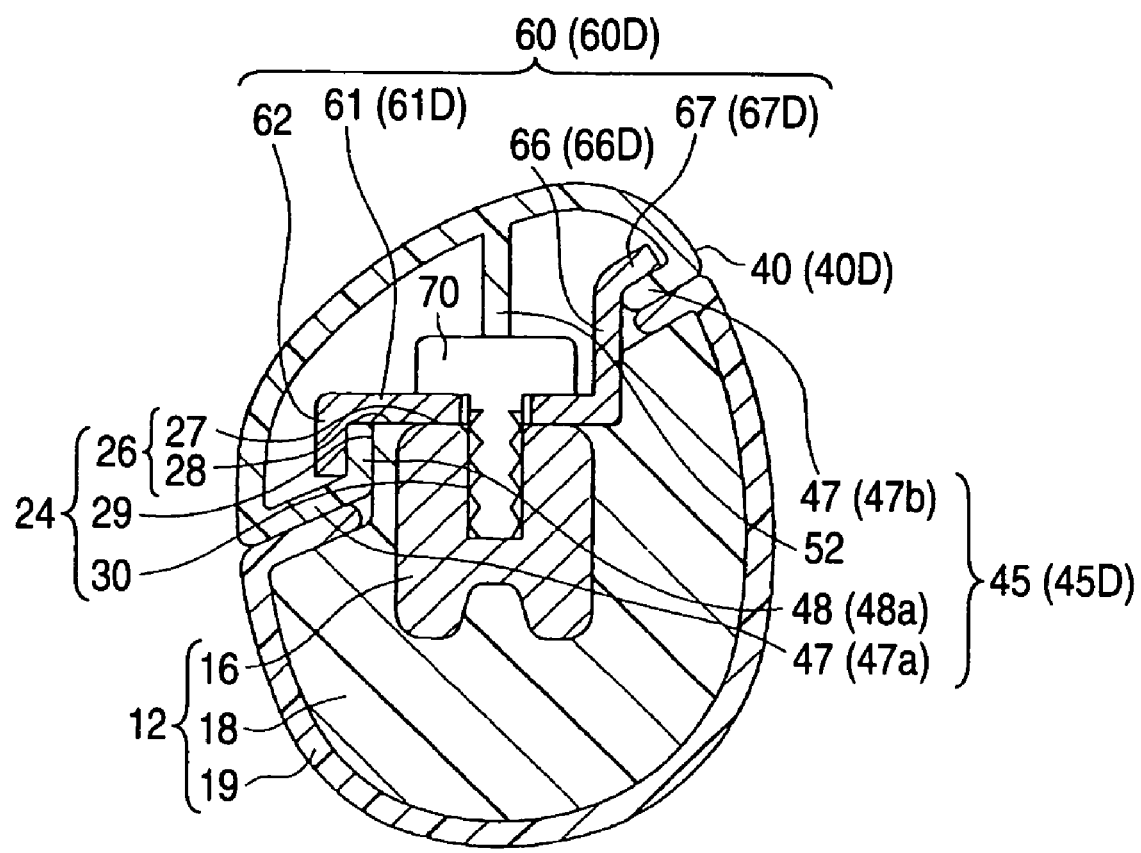
FIG. 10 is a sectional view of the other modified example of the embodiment.

Another modified example of the embodiment will be described by reference to FIGS. 9 and 10. A garnish 40D differs from the garnish 40A in that in a mount seat 45D, the seat surface portion 49 of the mount seat 45 and the connecting portion 48 (48b) which connects the seat surface portion 49 and a leg portion 47 (47b) together are removed, in that in a reinforcement member 60D, the reinforcement member 60D has an extending portion 66 (66D) which is provided so as to extend from a plate portion 61D which corresponds to the plate portion 61 of the reinforcement member 60, so that an end portion 67 (67D) of the extending portion 66 (66D) is brought into abutment with the leg portion 47 (47b) of the mount seat 45D, and in that a hole portion 68 is provided in the plate portion 61D so that the clip 70 is assembled thereinto. Due to this, the reinforcement member 60D is brought into direct abutment with the mount surface 26 of the mount portion 24 of the steering wheel body 12, and a box portion 46D (more particular, a connecting portion 48 (48a) and the leg portion 47 (47b) of the box portion 46D) of the mount seat 45D is held by the reinforcement member 60D (more particularly, a plate portion 62 and an end portion 67 (67D) of the reinforcement member 60D) and the location of the steering wheel body 12 (more particularly, the rim cover body 18 or the skin 19 which provided on the outer surface of the rim cover body 18) where the mount portion 24 is provided. In this embodiment, too, however, a cross section of the garnish 40D at a location where the mount seat 45D is provided is formed into substantially an annular shape surrounding the reinforcement member 60D therein. Consequently, a similar advantage to that provided by the garnish 40A can be obtained.

In the embodiment (including the two modified examples), while the assembly of the reinforcement member 60 to the mount seat 45 is implemented by inserting the reinforcement member 60 into the box portion 46, the following mode may be adopted. Although not shown, a configuration may be adopted in which cylindrical bosses or circular post-like pins are made to protrude from the rearward surface 42 of the garnish base body 41 at positions in the vicinity of the end portions 44 (44a, 44b) of the garnish base body 41, respectively, and through holes are provided at corresponding locations on the reinforcement member 60 through which the bosses or bins are passed, whereby after the bosses or pins are passed through the through holes, protruding portions of the bosses or pins may be fused to be deformed (by implementing a so-called heat crimping) so as to form dislodgement preventive portions which ensures the mounting of the reinforcement member 60 on the garnish 40.

In this mode, too, a cross section of the garnish 40 at the location where the mount seat 45 is provided is formed into substantially an annular shape surrounding the reinforcement member 60 therein. Consequently, a similar advantage to that provided by the garnish 40 in the embodiment can be obtained.

What is claimed is:

1. A steering wheel comprising:
   a rim part including a core and a cover portion surrounding said core to cover an outer surface of said core, said cover portion including a decorative component having a base portion made of a synthetic resin;
   wherein said a decorative-side engagement portion of said decorative component is fixed to a core-side engagement portion of said core, whereby said decorative component is fixed to said core;
   wherein said decorative component is provided with a reinforcement member that is made of a metal;
   wherein said decorative component includes a mount seat on which said reinforcement member is mounted; and
   wherein a cross section of said decorative component at a location where said mount seat is provided is formed into an annular shape surrounding said reinforcement member therein.

2. A steering wheel according to claim 1, wherein said mount seat is held between a part of the rim part which is other than said decorative component and said reinforcement member.

3. A steering wheel according to claim 1, wherein said decorative-side engagement portion is provided in said mount seat.

4. A steering wheel according to claim 1, wherein the reinforcement member is one of a plurality of reinforcement members provided along said decorative component.

5. A steering wheel according to claim 4, wherein said mount seat is one of a plurality of mount seats provided along said decorative component at constant intervals.

6. A steering wheel according to claim 1, wherein said mount seat is integrally formed with said base portion of said decorative component on an opposite surface to an outer surface of said decorative component.

7. A steering wheel comprising:
a rim part including a core and a cover portion surrounding said core to cover an outer surface of said core, said cover portion including a decorative component having a base portion made of a synthetic resin;
wherein said a decorative-side engagement portion of said decorative component is fixed to a core-side engagement portion of said core, whereby said decorative component is fixed to said core;
wherein said decorative component is provided with a reinforcement member that is made of a metal; and
wherein said reinforcement member is formed into an L-shape in which two plate portions are combined at substantially right angle to each other.

8. A steering wheel comprising:
a rim part including a core and a cover portion surrounding said core to cover an outer surface of said core, said cover portion including a decorative component having a base portion made of a synthetic resin;
wherein said a decorative-side engagement portion of said decorative component is fixed to a core-side engagement portion of said core, whereby said decorative component is fixed to said core;
wherein said decorative component is provided with a reinforcement member that is made of a metal; and
wherein said decorative-side engagement portion includes an engagement portion of a clip and said core-side engagement portion includes an engagement hole formed on said core, wherein said decorative component is fixed to said core by inserting said engagement portion of said clip into said engagement hole.

9. A steering wheel according to claim 8, wherein said reinforcement member is interposed between a part of said clip and said core.

10. A steering wheel according to claim 8, wherein a mount seat on which said reinforcement member is mounted is integrally formed with said base portion of said decorative component on an opposite surface to an outer surface of said decorative component, and
a part of said mount seat is interposed between a part of said clip and said core.

* * * * *